April 23, 1946.   W. O. CLINEDINST   2,399,103
JOINT AND METHOD OF MAKING THE SAME
Filed June 5, 1944
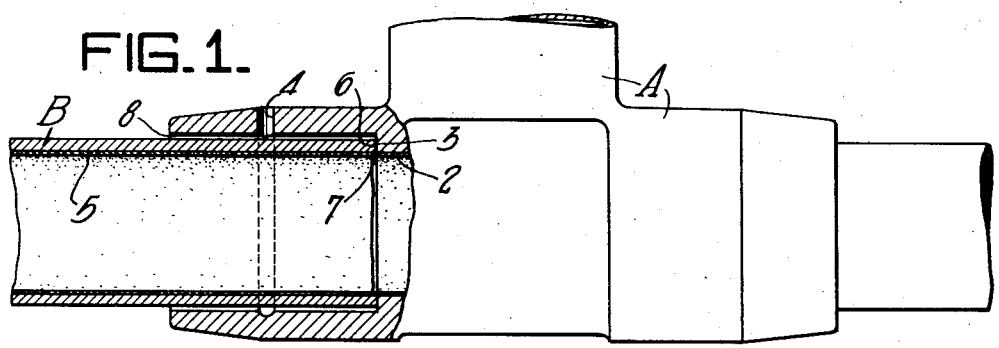
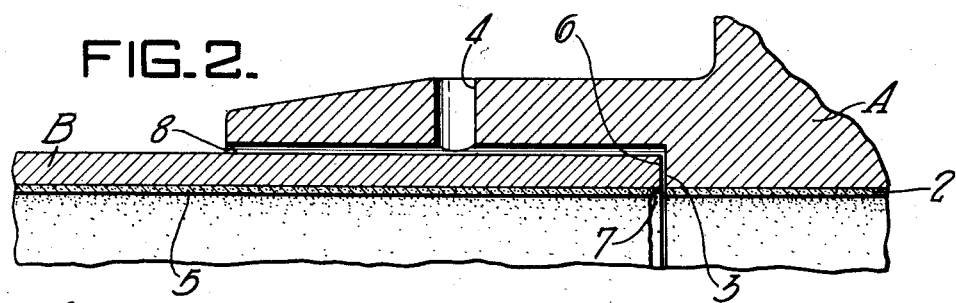
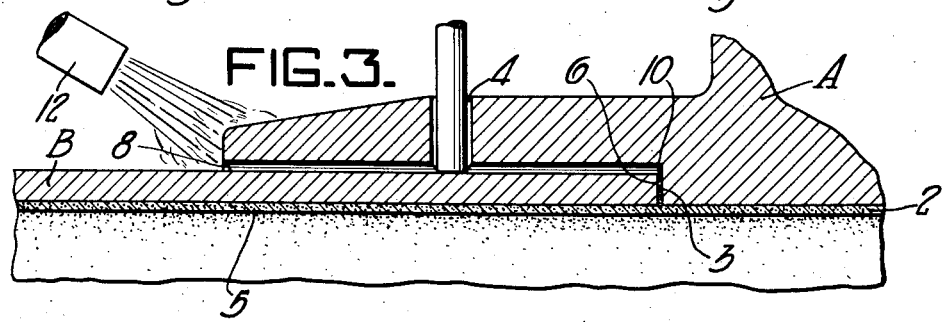
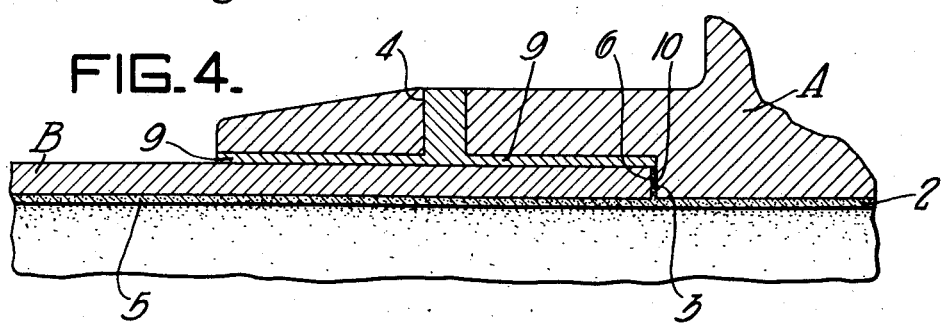
Inventor:
WILLIAM O. CLINEDINST,
by: John E. Jackson
his Attorney.

Patented Apr. 23, 1946

2,399,103

UNITED STATES PATENT OFFICE 2,399,103

JOINT AND METHOD OF MAKING THE SAME

William O. Clinedinst, Mount Lebanon, Pa., assignor to National Tube Company, a corporation of New Jersey Application June 5, 1944, Serial No. 538,814

1 Claim. (Cl. 285—115)

This invention relates to a joint for and method of connecting pipe which has a corrosion resistant lining.

Synthetic resin varnishes of the thermo-setting type have been developed which provide a highly corrosion resisting lining for pipe. These linings, dependent upon the composition thereof, are baked on at temperatures in the general range of 400° to 500° F. One factor that militates against the widespread use of pipe so lined, despite the much longer life thereof, is the difficulty of satisfactorily joining the same. Since such linings tend to be somewhat brittle cutting pipe so lined to length will injure the lining which tends to chip or break away from the point where the cut is made. Moreover, it has been found that the conventional threaded joints are unsuitable for the reason that in addition to the foregoing disadvantages, the threading dies tend to distort or flex the pipe at the region being threaded thereby loosening or crushing the lining. It is also difficult to provide protection for the end section of the pipe in a threaded joint since the threads will not make up to the same point in all instances.

It is accordingly an object of this invention to provide a method for connecting pipe having a plastic lining.

It is a further object of this invention to provide a method and means for connecting lined pipe in an expeditious manner.

The foregoing and further objects will be understood from the following description and drawing wherein:

Figure 1 is an elevational view partly in section of a connector and pipe in telescoped relation;

Figure 2 is an enlarged portion of the joint of my invention;

Figure 3 is a diagrammatic showing of the method of making this joint; and

Figure 4 shows the completed joint.

Referring more particularly to the drawing, the letter A designates a connector member having a corrosion resisting inner surface 2, and a shoulder portion 3 therein. An aperture 4 may be provided for feeding liquid solder to the interior thereof.

The letter B designates a pipe having a corrosion resisting lining 5 telescoped in the connector member A. The lining may be a phenol formaldehyde synthetic resin or plastic of the type which polymerizes and becomes infusible and insoluble and highly corrosion resistant if heated to the proper temperature, which for most such materials is in the range of 400 to 600° F. Such resins or plastics are sometimes referred to as thermo-setting and may have a filler such as wood-flour or canvas and contain a pigment such as iron oxide or carbon.

When installing a line of pipe lined with such materials, it is necessary to cut the lengths of pipe at certain points. Cutting the pipe even by the most careful methods will damage the lining 5 and a certain amount thereof will break away from the cut end 6 leaving the metal surface unprotected as at 7.

I have found that pipe lined with such material can be made which will provide a continuous corrosion resisting surface by soldering or "sweating" the members together. In this method of connecting members, they are telescoped with an annular space 8 therebetween. If this space is of the proper order, it will exert a capillary attraction on liquid solder inserted therein thereby completely filling such space with solder 9 as shown in Figure 4. The solder used may be one of the combined lead-tin varieties which have a melting point of about 500° F., or between 500° and 600° F.

In making a joint in accordance with the teachings of my invention, a tubular member B having a plastic lining 5 which has been damaged and broken away from the end 6 as at 7 is coated with a synthetic resin or plastic 10 of the thermo-setting type which polymerizes at around 400 to 600° F., and is then inserted in the connector member A so that the end 6 abuts the shoulder 3. The coating 10 thus completely fills any space between the end 6 and the shoulder 3 and covers the exposed metal at 7. The members A and B are then heated with suitable means such as a blow torch 12 to raise the temperature thereof to around 500° F., or the melting point of the solder having the proper melting temperature, which is then inserted in the feed hole 4 whereupon it is melted, and due to capillary attraction, is drawn throughout the annular space 8 completely filling it. At the same time, since the heating is regulated to the proper temperature, the coating 10 is polymerized becoming infusible and insoluble, thereby providing a continuous corrosion resistant lining throughout the joint.

While I have shown and described one specific embodiment of my invention, it will be understood that this embodiment is merely for the purpose of illustration and description and that various other forms may be devised within the scope of my invention, as defined in the appended claim.

I claim:

In a bonded pipe and socket joint between members having linings, means for providing an uninterrupted lining at the juncture of the lining ends comprising a ring of thermo-setting plastic interposed therebetween, said plastic being hardened by heat applied to the joint to fuse the bonding material.

WILLIAM O. CLINEDINST.